United States Patent [19]

Storm

[11] 4,207,226
[45] Jun. 10, 1980

[54] CERAMIC COMPOSITION SUITED TO BE INJECTION MOLDED AND SINTERED

[75] Inventor: Roger S. Storm, Williamsville, N.Y.

[73] Assignee: The Carborundum Company, Nigara Falls, N.Y.

[21] Appl. No.: 930,635

[22] Filed: Aug. 3, 1978

[51] Int. Cl.$^2$ ............................................. C08L 61/06
[52] U.S. Cl. ........................................ 260/38; 106/43; 106/44; 106/299; 106/308 M; 106/308 Q; 260/37 N; 260/37 R; 260/42.11; 264/63; 264/328
[58] Field of Search ............... 106/43, 44, 299, 308 M, 106/308 Q, 73.5; 260/429.5, 42.11, 38, 37 N, 37 R; 264/63, 328

[56] References Cited

U.S. PATENT DOCUMENTS

| | | | |
|---|---|---|---|
| 2,593,507 | 4/1952 | Wainer | 264/63 X |
| 2,621,193 | 12/1952 | Langkammerer | 260/429.5 |
| 3,309,212 | 3/1967 | Lubalin | 106/44 |
| 3,660,134 | 5/1972 | Morris et al. | 260/429.5 |
| 3,947,550 | 3/1976 | Fitchmun | 106/44 X |
| 4,000,110 | 12/1976 | Saito et al. | 260/42.11 |
| 4,023,975 | 5/1977 | Prochazka | 106/44 |
| 4,041,117 | 8/1977 | Prochazka | 264/63 |
| 4,069,192 | 1/1978 | Monte et al. | 260/429.5 |
| 4,080,353 | 3/1978 | Monte et al. | 260/429.5 |
| 4,087,402 | 5/1978 | Monte et al. | 260/429.5 |

Primary Examiner—Helen M. McCarthy
Attorney, Agent, or Firm—David E. Dougherty; Raymond W. Green; Donald C. Studley

[57] ABSTRACT

Ceramic compositions that may be injection molded and subsequently sintered are described. The compositions include minor amounts of organo-titanates which materially reduce the viscosity of the compositions. The reduction in viscosity is particularly effective in compositions containing high loadings of silicon carbide as the ceramic material. The organo-titanates found useful are represented by the formula:

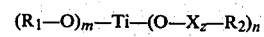

$$(R_1-O)_m-Ti-(O-X_z-R_2)_n$$

wherein:
(a) m is an integer from 1 to 8 and n is an integer from 0 to 4,
(b) m+n=4,
(c) z is an integer from 0 to 1,
(d) R$_1$ is aliphatic containing 1 and 4 carbon atoms,
(e) X is independently selected from the group of phosphite, phosphate, and pyrophosphate.
(f) R$_2$ is aliphatic containing from 8 to 25 carbon atoms.

6 Claims, No Drawings

CERAMIC COMPOSITION SUITED TO BE INJECTION MOLDED AND SINTERED

BACKGROUND OF THE INVENTION

The present invention relates to injection molding of ceramic articles and, in particular, to the production of dense, hard articles having industrial uses. Although the present invention will be discussed in regard to compositions containing silicon carbide as the ceramic material, it will be understood that other sinterable metal carbides, for example, titanium carbide, may be utilized as the ceramic material.

Silicon carbide has long been known for its hardness, strength, and excellent resistance to oxidation and corrosion. Silicon carbide has a low coefficient of expansion, good heat transfer properties, and maintains high strength at elevated temperatures. In recent years, the art of producing high-density silicon carbide materials by sintering silicon carbide powders has been developed. High-density silicon carbide materials find utility in the fabrication of components for turbines, heat exchange units, pumps, and other equipment or tools that are exposed to severe corrosion or wear, especially in operations carried out at high temperatures. The present invention relates to sinterable metal carbide compositions which may be injection molded and subsequently sintered to produce high-density products. The present invention further relates to the use of silicon carbide as the ceramic material and, in particular, to ceramic compositions containing predominantly the alpha crystalline form of silicon carbide.

Ceramic bodies or compacts may be formed by various processes, for example, by slip casting, by pressing a green body followed by sintering, or by hot pressing, and subsequently shaping or machining of the sintered body to produce the finished product. Injection molding is a process wherein a moldable composition is forced into a mold or die. Injection molding allows molding of complex shapes. The injection molding process facilitates a rapid and repeated forming of a plurality of articles having a consistent shape with close dimensional tolerance. The injection molding process minimizes the amount of shaping or machining that may be required to produce a finished article. Injection molding of the present ceramic compositions may be carried out by either the transfer method or by the direct injection method utilizing known injection molding techniques.

Many problems are encountered in injection molding of ceramic materials, especially if particulate silicon carbide is utilized as the ceramic material. The irregularly shaped particles tend to pack as pressure is applied; ceramic materials have an innate resistance to flow. The packing of such materials in pressing or molding operations frequently causes internal stresses in the pressed or molded article which lead to consequent failure of the finished product. The abrasive properties of the ceramic materials must be considered, as the material itself rapidly wears away all surfaces with which the ceramic particles come in contact. Repeated use of ceramic materials, especially those containing silicon carbide, is extremely detrimental to the mold or die surface against which it is forced. Such wear soon makes the mold less accurate, and additional finishing steps are required to obtain and maintain close tolerances in the molded articles. Thus, injection molding of ceramic materials, such as silicon carbide, has not been deemed heretofore to be economically feasible.

Co-pending application Ser. No. 864,415 filed Dec. 27, 1977 now U.S. Pat. No. 4,144,207 describes compositions and processes for injection molding ceramic compositions containing silicon carbide as the ceramic material. The present compositions are useful in the processes described in that application.

In a typical method of injection molding ceramic compositions which include silicon carbide, the compositions contain from about 65 to about 85 percent by weight ceramic material. The remainder of the composition comprises sintering aids, a thermoplastic resin material, suitably an oil or wax having a vaporizing point less than that of the thermoplastic resin material, and, for best results, a lighter, more volatile oil. The components are mixed and formed into an article by known injection molding techniques. The formed article is then baked at temperatures between about 700° and about 1000° C. in a nonoxidizing atmosphere to remove the resins, waxes and oils by destructive distillation in a manner to prevent the removal of the residual char carbon. The baked article is then sintered at temperatures between about 1900° and about 2200° C.

Up to now, it has been most difficult to obtain loadings approaching 75 percent by weight or above of the ceramic material, e.g., silicon carbide, in the composition because, when higher loadings are used, the flowability of the composition is adversely affected.

GENERAL DESCRIPTION OF THE INVENTION

In accord with the present invention, it has been found that minor amounts of organo-titanates materially reduce the viscosity of compositions of ceramic materials, resins, waxes and oils. The reduction in viscosity is particularly effective in mixtures containing silicon carbide as the ceramic material. The organo-titanates found useful are represented by the following formula:

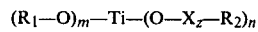

$$(R_1-O)_m-Ti-(O-X_z-R_2)_n$$

wherein:
(a) m is an integer from 1 to 4 and n is an integer from 0 to 4,
(b) m+n=4,
(c) z is an integer from 0 to 1,
(d) $R_1$ is aliphatic containing from 1 to 8 carbon atoms,
(e) X is independently selected from the group of phosphite, phosphate and pyrophosphate,
(f) $R_2$ is aliphatic containing from 8 to 25 carbon atoms.

Generally, amounts of organo-titanates found suited to use range between about 0.1 and about 3.0 percent by weight of the ceramic composition. Usually, little viscosity improvement is found when less than about 0.1 percent of the organo-titanate is included. Amounts of organo-titanate greater than about 3.0 percent generally do not yield significant additional improvement in viscosity and, in view of the amount of additional materials being added to the ceramic composition, usually are not utilized. After sintering, products contain up to about 0.4 percent by weight titanium but are found as acceptable and useful as sintered products containing no titanium.

DETAILED DESCRIPTION OF THE INVENTION

The present invention relates to ceramic compositions that may be injection molded and subsequently sintered. For the purpose of clarity, the detailed description is divided into two main sections. One section, with appropriate subsections, relates to the components of the present compositions. The second section and related subsections describe the mixing, molding, and sintering operations in which the compositions are useful.

I. COMPOSITION COMPONENTS

A. Ceramic Material

The ceramic material comprises at least about 65 percent by weight of the composition. A range of from about 70 to about 80 percent by weight is usually employed. Within this range, marked improvement in flowability of the composition is obtained by the addition of organo-titanates. Loadings above about 85 percent by weight are normally not utilized because of the viscosity of the composition. The present invention allows loadings of up to about 90 percent by weight of ceramic material with a flowability adapted to good molding practice.

The ceramic material utilized in the present invention is preferably utilized in finely-divided form. The preferred material has an average size from about 0.10 to about 2.00 microns, with a maximum of about 5.00 microns. Although the size is a critical parameter, surface area is equally of relevant consideration in determining the suitable material. Accordingly, the preferred silicon carbide particles as used in the present composition have a surface area of from about 1 to about 100 m²/g. Within this range, it is more preferred that the surface area of particles range between about 5 and about 20 m²/g. Particles with a surface area in this latter range have been found eminently useful in producing the compositions of the present invention.

Suitably, the ceramic material is a metal carbide. Silicon carbide is a preferred ceramic material. The silicon carbide may be either alpha or beta phase or may be amorphous. At the present time, the alpha (non-cubic) crystalline phase of silicon carbide is most economically obtained. The present compositions may contain substantially entirely, e.g., 95 percent or more by weight, silicon carbide of the alpha phase or may contain mixtures of the various forms of silicon carbide. For example, mixtures which are predominantly alpha phase (greater than 50 percent) are aptly suited to use. The ceramic material may contain minor amounts of impurities without deleterious effect; generally, a purity of about 95 percent is required and a higher purity desired.

B. Sintering Aids

Materials which react with the ceramic material at sintering temperatures to form a sintered product are utilized as sintering aids. For example, materials containing carbon, beryllium, nitrogen, or boron are examples of such aids. More specifically, from about 0.3 to about 5.0 percent by weight of the silicon carbide of boron or beryllium or mixtures thereof are useful as sintering aids, and, within this range, from about 0.5 to about 4.0 percent by weight of the aid has been found aptly suited to use. Elemental boron or beryllium, compounds of boron or beryllium, or mixtures thereof are suitable sources of boron and beryllium. Nitrides and carbides of boron and beryllium are eminently useful as sintering aids.

C. Carbon

The present compositions contain excess carbon in amounts of from about 0.05 to about 5.0 percent by weight of the composition after baking. Excess carbon is free or uncombined carbon which remains in the composition after baking. Excess carbon in amounts of from about 1.0 to about 4.0 percent by weight are eminently useful. Excess carbon is an aid in sintering and has been found to be beneficial in reducing the amounts of various oxides, impurities in the starting ceramic material, that otherwise would remain in the finished product. In accord with the present invention, the excess carbon required is supplied entirely or substantially entirely by the char or residue of the organic materials utilized as injection molding additives. In practice, the carbon that will be added by the char of the molding additives may be calculated and, if additional carbon is required, it may be added with the ceramic starting material. If the amount of char is more than required, it may be eliminated during the baking step.

D. Titanate Additive

The titanate additives useful in the present invention may be generally classed as monoalkoxy and correspond to the following general formula:

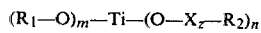

$$(R_1-O)_m-Ti-(O-X_z-R_2)_n$$

wherein:
(a) m is an integer from 1 to 4 and n is an integer from 0 to 4,
(b) m+n=4,
(c) z is an integer from 0 to 1,
(d) $R_1$ is aliphatic containing from 1 to 8 carbon atoms,
(e) X is independently selected from the group of phosphite, phosphate and pyrophosphate,
(f) $R_2$ is aliphatic containing from 8 to 25 carbon atoms.

Examples of useful titanates are: tetra (2-ethylhexyl) titanate; isopropyl, triisostearoyl titanate; tetraisopropyl, di(tridecylphosphito) titanate; titanium di(dioctylphosphate) oxacetate; titanium di(dioctylpyrophosphate) oxyacetate; isopropyl, isostearoyldiacryl titanate; isopropyl, tri(dioctylphosphate) titanate; isopropyl, tri (dioctylpyrophosphate) titanate; tetraisopropyl, di (dioctylphosphito) titanate; and, di (dioctylpyrophosphato) ethylene titanate.

Marked lowering of viscosity is obtained when minor amounts of titanate additive is included in ceramic mixtures. The flowability of ceramic mixtures is thus greatly increased, and mixtures having high loadings of ceramic materials, in the range of 85 to 90 percent by weight, may now be utilized in injection molding operations.

The additives are usually utilized in a range of from about 0.1 to about 3.0 percent by weight of the composition, and, within this range, from about 0.2 to about 2.5 percent by weight has been found eminently useful. Generally, less than about 0.1 percent by weight of the additive does not affect the viscosity sufficiently to yield mixtures suited to be injection molded. Amounts over about 3 percent by weight usually are not required for flowability and may affect the firmness of the molded product. Another consideration is the added titanium content in the final sintered product which may be undesirable. Utilizing the titanate additives in the above ranges generally adds about 0.2 percent by weight or less to the final sintered product.

E. Injection Molding Additives

1. Resin

One of the components of the present composition is a resin, preferably a thermoplastic resin. Although other resins may have some use, thermoplastic resins are preferable as they have good storage properties, and better facilitate the molding of intricate parts. The principal purpose of the resin is to hold the particles together in a mass so that, after molding, the formed body is sufficiently bonded together to closely maintain its molded shape. Thermosetting resins such as phenol-fomaldehyde and acrylic resins, ethyl cellulose, ABS, hydroxypropyl cellulose, low density polyethylene, oxidized polyethylene, cellulose acetate, nylon, ethylene acrylic copolymer, cellulose acetate butyrate, polystyrenes, polybutylene, polysulfone, polethylene glycol, and polyethylene oxide have been found useful. However, it has been found that styrene resins, such as plasticized polystyrene, are particularly adapted to use. Amounts of resin between about 12 and about 18 percent by weight of the composition have been found eminently suited to use. Volatilization temperature of the resin component is also important, and volatilization temperatures between about 200° and about 500° C. are preferred. Thermoplastic resins having a volatilization temperature of between about 200° and about 300° C. are found especially useful. Thus, the resin component must be chosen to have both the ability to coat the ceramic particles and to volatize in the desired temperature range. The ability to coat is affected by the particle size of the ceramic material. The resin component must also hold the particles together after injection molding, and, lastly, the resin may carbonize to supply carbon to the composition to facilitate sintering. Plasticized styrene, polystyrene, and related styrene resins are excellently suited to use in the present invention. Compositions containing styrene resins also have good mold release characteristics which are not usually found in most thermoplastic resins.

2. Wax or High Volatizing Oil

The present compositions also contain a wax or high volatizing oil. The wax or oil preferably has a volatilizing point between about 160° and 190° C. The volatilizing point of this component is below the resin component discussed above. This component may also be a lubricant, for example, fatty acids such as stearic acid, fatty acid esters, and hydrocarbon waxes. Ranges from about 2.0 to about 8.0 percent by weight of the composition have been found useful. Examples are paraffin, mineral oils, vegetable oils, and waxes.

3. Low Volatizing Hydrocarbon or Oil

If desired, the present compositions may also contain a lower volatizating hydrocarbon or oil which also may be carbonized. This component has a vaporizing point between about 50° and about 150° C. This component may be animal, vegetable, or mineral and has a vaporizing point below that of the wax or high volatilizing oil component. Amounts of this component between about 1.0 and about 9.0 percent by weight of the composition have been found useful. Examples of useful low volatilizing materials are light mineral and vegetable oils.

4. Lubricant or Mold Release Agent

A minor amount, generally from about 1 to about 3 percent by weight, of the composition, of a lubricant or mold release material has been found useful in some cases. This component is optional and may not be needed because of the lubricating characteristics of the other injection molding additives. Preferably, the lubricant is a fatty or waxy material that aids in protecting the equipment from the abrasive ceramic material and also aids in release of the article from the mold. Examples of lubricants are fatty acids, fatty alcohols, fatty esters, and hydrocarbon waxes.

II. PROCESS

A. Mixing

The main objective of mixing is to obtain a thoroughly heterogenous mixture of the components. The order in which the components are mixed is not important as long as a heterogenous mixture is obtained for the molding step. For example, the ceramic material and the sintering aid may initially be mixed together, either dry or wetted, milled, dried, granulated, baked, and dry milled, the injection molding additives added, and the resulting mixture milled, granulated, and milled to obtain a suitable mixture. The mixing of the ceramic material and the injection molding additives may be accomplished by various techniques. A useful method is to mix the components in a sigma blade mixer, either cold or heated. A mixing time of about one hour is usually found to give a good mixture. Preferably, before the mixture is utilized in the molding operation, it is screened to yield a mixture having a more consistent particle size. Generally, a mixture passing a screen having $\frac{1}{2}$ inch openings is eminently useful in the molding step.

B. Molding

The molding step is accomplished by known injection molding techniques. Injection molding operations are usually carried out utilizing the transfer method or the direct injection method. In the transfer method, a hydraulic press is utilized to force the material from a heated storage chamber, by means of a plunger, through spruces or runners, into a mold. Molding pressure is based upon the area of the plunger in the storage chamber and usually requires about 750 psi to force the present mixtures into a mold. In the direct injection method, the heated mixture is forced directly into the mold by either a hydraulic plunger or by reciprocating screw equipment. Either method may be utilized. The advantages of the direct injection process are that less waste is generated, there is a more uniform heating of the molding mixture, and faster molding cycles are possible.

In either case, the mixture to be molded is fed into the injection molding die with sufficient heat and pressure to force the mixture to flow into all areas of the die. A temperature slightly higher than the melting point of the thermoplastic resin-oil system is utilized. Temperatures in the range of from about 150° to about 325° C. are generally useful. A pressure sufficient to flow the present mixtures into a mold is required. Pressures in the range of from about 1000 to about 10,000 psi are usually sufficient.

The residence time in the mold varies from about 1 to about 60 seconds, depending upon the temperature of the mold. When the mold is maintained at ambient temperature, a residence time of about two seconds produces a full and firm molded article.

C. Baking

After removal of the article from the mold, the article is baked. Baking temperatures usuallly range from about 500° to about 1000° C., and a range from about 700° to about 900° C. has been found eminently useful. The baking time depends upon the thickness of the molded article and is best extended to insure that no blistering or slumping occurs in the article. Starting at a temperature of about 50° C., the temperature is raised in increments of about 1° to 10° C. per hour to a final baking temperature of about 800° C. The product of the baking step is a porous, shaped article containing the ceramic material, the sintering aids, and excess carbon.

D. Sintering

The product from the baking step is next sintered to obtain the final product. The baking step and the sintering step may be carried out in a common furnace; however, because of the rather large differences in the temperature range of the two steps, they are preferably carried out in separate furnaces. The sintering step is carried out by known sintering methods and techniques.

The sintering operation is preferably carried out in a vacuum or inert gas such as nitrogen or argon. The article is sintered at temperatures between about 2000° C. and 2200° C. The sintering time is usually between about 20 minutes and one hour at such temperatures. Preferably, the sintering operation is carried out in increments; for example, a heating to about 1500° C. over a period of about 4 hours, and a 300° C. per hour increase to about 2150° C.

E. Finishing

If desired, the sintered product may be finished to even a higher degree of tolerance by machining, for example, by diamond grinding, electrochemical machining, ultrasonic machining, or by electrical discharge machining techniques, to produce tools or articles requiring extremely close tolerances.

The following examples are illustrative and are not to be interpreted as limiting of the present invention. Unless otherwise noted, parts are in parts by weight, and temperatures are in degrees Celsius.

EXAMPLE I

Control 66.3 parts of particulate silicon carbide having a particle size of about 1 micron, 10.9 parts of plasticized polystyrene resin, 2.3 parts stearic acid wax, and 5.5 parts of a No. 40 oil were placed in a sigma blade mixer, steam heated to about 150° C., and mixed for one hour. The product was allowed to cool and was then granulated and screened. The mixture contained about 78 percent by weight of silicon carbide. The screened material, passing a ½ inch screen, was then tested for viscosity utilizing Brabender Plasticorder. The Brabender Plasticorder is an instrument which measures the torque on a shaft running at a constant speed. A high torque reading represents a high viscosity of the mixture being tested. The Brabender Plasticorder readings are measured at equilibrium, when the torque is constant, in meter-grams. Tests were conducted at 135° C., 145° C., and 155° C. The results are shown in the first column of Table I below.

EXAMPLE II

Invention

A composition identical to that used in Example I was utilized, except that 0.425 parts, about 0.5 percent by weight, tetra (2-ethylhexyl) titanate was added. The processing and testing steps of Example I were repeated. The test results are shown in the second column of Table I below.

TABLE I

| Temperature | Example I Brabender Plasticorder meter-grams torque | Example II Brabender Plasticorder meter-grams torque |
|---|---|---|
| 135° C. | 380 | 45 |
| 145° C. | 250 | 20 |
| 155° C. | 180 | 15 |

EXAMPLE III

Invention

Compositions identical to that used in Example I were utilized except that 0.425, about 0.5 percent by weight, of various organo-titanates were included. The compositions were initially mixed in the mixing chamber of the Brabender Plasticorder. The tests were conducted at 135° C. The results of the tests using the various organo-titanates are shown in the following table.

| Organa-titanate | Brabender Plasticorder meter-grams torque |
|---|---|
| tetraisopropyl, di(tridecylphosphito) titanate | 0 |
| isopropyl, triisostearoyl titanate | 10 |
| titanium di(dioctylphosphate) oxacetate | 35 |
| titanium di(dioctylpyrophosphate) oxyacetate | 45 |
| isopropyl, isostearoyldiacryl titanate | 55 |
| isopropyl, tri(dioctylphosphate) titanate | 65 |
| isopropyl, tri(dioctylpyrophosphate) titanate | 70 |
| tetraisopropyl, di(dioctylphosphito) titanate | 88 |
| di(dioctylpyrophosphato) ethylene titanate | 105 |

The foregoing embodiments are intended to illustrate the invention without limiting it thereby. Various modifications can be made in the invention without departing from the spirit and scope thereof.

What is claimed is:

1. A ceramic composition suited to be injection molded consisting of:
   (a) from about 65 to about 90 percent by weight of particulate silicon carbide,
   (b) from about 12 to about 18 percent by weight of a thermoplastic resin having a volatilization temperature between about 200° and about 500° C.,
   (c) from about 2 to about 8 percent by weight of an oil or wax having a lower volatilizing temperature than said resin, and
   (d) from about 0.1 to about 3.0 percent by weight of an organo-titanate selected from the group consisting of tetra (2-ethylhexyl) titanate; isopropyl, triisostearoyl titanate; tetraisopropyl, di(tridecylphosphito) titanate; titanium di(dioctylphosphate) oxacetate; titanium di(dioctylpyrophosphate) oxyacetate; isopropyl, isostearoyldiacryl titanate; isopropyl, tri(dioctylphosphate) titanate; isopropyl, tri(dioctylpyrophosphate) titanate; tetraisopropyl, di(dioctylphosphito) titanate, di(dioctylpyrophosphato) ethylene titanate, or mixtures thereof.

2. The composition of claim 1 wherein the organo-titanate is tetra (2-ethylhexyl) titanate.

3. The composition of claim 1 wherein the organo-titanate is tetraisopropyl, di(tridecylphosphito) titanate.

4. A sinterable ceramic composition suited to be injection molded and substantially sintered at temperatures between about 1900° and about 2200° C. consisting of:
  (a) from about 65 to about 90 percent by weight of particulate silicon carbide,
  (b) from about 12 to about 18 percent by weight of thermoplastic resin having a volatilization temperature between about 200° C. and about 500° C.
  (c) from about 2 to about 8 percent by weight of an oil or wax having a lower volatilizing temperature than said resin, and
  (d) from about 0.3 to about 5.0 percent by weight, based upon the weight of said silicon carbide, of boron or beryllium, or mixtures thereof as a sintering aid, and
  (e) from about 0.1 to about 3.0 percent by weight of an organo-titanate selected from the group consisting of tetra (2-ethylhexyl) titanate; isopropyl, triisosteroyl titanate; tetraisopropyl, di(tridecylphosito) titanate; titanium di(dioctylphosphate) oxacetate; titanium di(dioctylpyrophosphate) oxyacetate; isopropyl, isostearoyldiacryl titanate; isopropyl, tri(dioctylphosphate) titanate; isopropyl, tri(dioctylpyrophosphate) titanate; tetraisopropyl, di(dioctylphosphito) titanate, di(dioctylphosphato) ethylene titanate, or mixtures thereof.

5. The composition of claim 4 wherein the organo-titanate is tetra (2-ethylhexyl) titante.

6. The composition of claim 4 wherein the organo-titanate is tetraisopropyl, di(tridecylphospito) titanate.

* * * * *